May 2, 1967 V. B. HONSINGER 3,317,874

ROTATING TRANSFORMER

Filed June 25, 1964

Inventor
Vernon B. Honsinger
By Robert B. Benson
Attorney

United States Patent Office 3,317,874
Patented May 2, 1967

3,317,874
ROTATING TRANSFORMER
Vernon B. Honsinger, Cincinnati, Ohio, assignor to Allis-Chalmers Manufacturing Company, Milwaukee, Wis.
Filed June 25, 1964, Ser. No. 377,822
4 Claims. (Cl. 336—120)

This invention relates to transformers and more specifically to a rotatable transformer in which the secondary winding of the transformer can be rotated and is adapted to be connected to a rotating load.

Rotatable transformers are used for the purpose of transferring electrical current and power from a stationary member to a rotating member. Hence, rotating transformers are used as exciters to provide electrical energy to the field of an A.C. generator, to provide electrical power to illuminate a rotating structure such as a carrousel or to heat a rotating member such as screw type conveyers used in certain chemical processes.

There are various methods of transferring electrical power from a stationary member to a rotating member such as a conventional exciter and contacts between a stationary and rotating member. However, both of these devices have drawbacks which restrict their use. For example, in the conventional exciter there is a magnetic flux linkage between the rotating and stationary members and the frequency of the voltage on the rotating member is dependent on the speed of the rotor and relative motion between the two members and, hence, requires external power in a mechanical form be supplied. In the second method mentioned, current is transmitted between a rotating member such as a commutator or slip ring and a stationary member such as a carbon brush. In this system there is very little power loss and the frequency of the voltage of the transfer power is not dependent on the speed of relative motion. However, there is always a certain amount of sparking between the stationary and movable parts as well as a certain amount of wear and carbon dust formed. Hence, this type of structure is completely unacceptable under certain conditions such as an explosive atmosphere or in places where strict requirements are in effect as far as dust and the like are concerned. Hence, the use of sliding contacts are unacceptable in many industries such as the chemical and petrochemical industries.

The rotating transformers of the prior art are usually made of solid cores or annular laminations of iron. However, both of these cores provided a very high reluctance path for the magnetic flux. In order to obtain the current and voltage required for industrial use of these transformers, excessive heat is generated which in turn decreases the flux carrying capacity of the cores rendering the transformers unacceptable.

The transformer of this invention overcomes the problems mentioned above by providing a laminated magnetic core in which the individual laminations extend longitudinally in a directon substantially parallel to the axis of the rotating core and radially in a plane which includes the axis of the rotating core. In such a construction, the normal flux pattern around the coils of the transformer follows the path of least reluctance which is in the plane of the laminations. In other words, the flux around the coils including the portion in the rotating core is in a direction of the flat portion or along the laminations rather than transverse to them.

Therefore, it is the object of this invention to provide a new and improved transformer.

Another object of this invention is to provide a new and improved rotatable transformer.

Another object of this invention is to provide a new and improved core structure for a rotating transformer.

Other objects and advantages will be apparent from the following description when read in connection with the accompanying drawing, in which.

Figure 1:
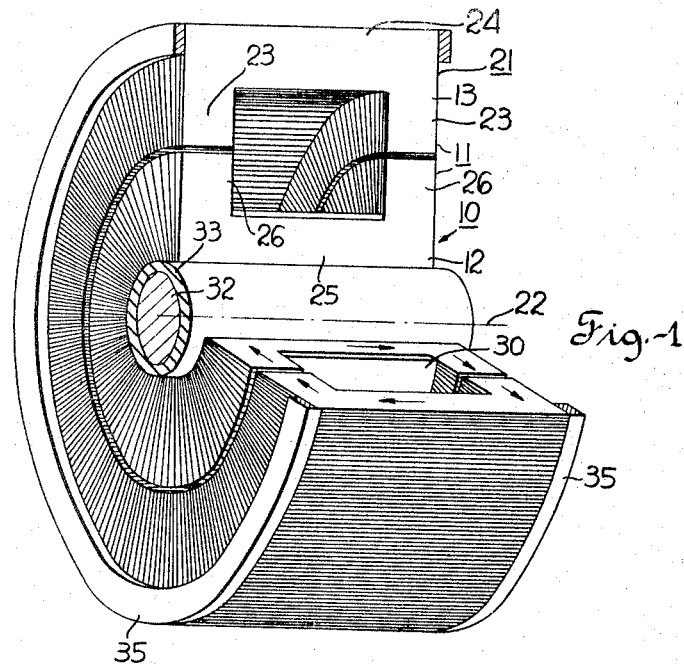
FIG. 1 is a cut-away perspective view of the core of a rotating transformer of this invention.
Figure 2:
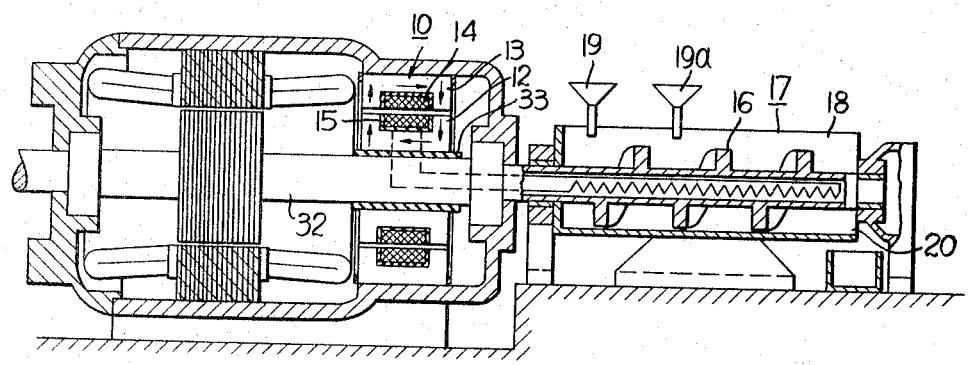
FIG. 2 is a cross section view of a motor driven unit utilizing the transformer of this invention to provide current to a rotating heating element.

Referring more particularly to the drawings by characters of reference, the invention is illustrated in FIGS. 1 and 2 in connection with a rotatable transformer 10 having a core 11 made up of a rotating member 12 and a stationary member 13. In the unit illustrated in FIG. 2, the rotating member is driven by an electric motor. Appropriate primary and secondary coils 14 and 15, respectively, are wound in the core between the members 12 and 13. The primary coil 14 which is stationary is connected to a suitable source of alternating current. The secondary coil 15 rotates with rotating core member 12 and is connected to a load such as the illustrated screw 16 of a conveyer 17 for moving and mixing materials. The conveyer has a tank 18 with two inlets 19, 19a and a discharge 20.

The stationary core member 13 can be of any suitable construction but in the preferred embodiment is made of a plurality of arcuately spaced, U-shaped iron laminations 21. The laminations 21 are arranged to form an annular core member and each lamination is positioned in a plane that includes the center line 22 of the core 11. As illustrated, the leg portions 23 of each lamination 21 extend radially inward toward the center line of the core. The connecting portions 24 of each of the U-shaped laminations extend longitudinally parallel to the axis of the core.

The rotating member 12 of the illustrated core 11 is constructed substantially identical to the primary or stationary core member with the exception that the U-shaped laminations 25 are inverted so that the legs 26 extend radially outward toward the stationary core member rather than radially inward. As in the case of the stationary core, the rotating core laminations 25 are arranged to form an annular member. The legs 23, 26 of both core members abut each other with a small air gap therebetween which does not materially affect the flux path in the transformer.

The core members 12 and 13 combine to form therebetween a torus 30 for housing the windings or coils of the transformer. As illustrated in the drawing, the torus is rectangular in cross section. Hence, when viewed in a plane including the center line of the core, it presents a rectangular winding window. Of course, the specific configuration of the winding window is not critical to this invention.

The primary and secondary coils 14, 15 of the transformer are wound or positioned within the torus 30 and are concentric both with each other and with the core members. As with any conventional transformer, the coils can be used interchangeably as primary or secondary coils depending on the way they are connected. Furthermore, either the radially inner or radially outer members 12, 13 could be made to rotate even though in the illustrated embodiments the radially inner member which is mounted on the shaft 32 is the rotating member of the transformer. A nonmagnetic sleeve 33 may be positioned over the shaft 32 to confine the flux path to the core 11.

For ideal transformer operation, each lamination forms a continuous uninterrupted path around the coils, and adjacent laminations preferably lie in substantially parallel planes to provide a magnetic path of minimum reluctance. In a rotating transformer it is impossible to provide these ideal conditions, but in the rotating transformer of this invention the laminations of the rotating and stationary cores are arranged around the center line of the core in such a manner that each lamination lies in a plane that includes the center line of the core. These planes are frequently identified as meredian planes. Hence, taken individually the laminations combine in pairs in a manner that the corresponding lamination of the inner and outer core lies in substantially the same plane so that the magnetic flux path extends radially inward along the legs of the transformer. Across the connecting member, back out along the legs of the laminations and then across the connecting member at their tops. This substantially uninterrupted flux path is illustrated by the arrows in FIGS. 1 and 2. The flux path follows the flat portions of the laminations in a complete circle around the conductors of the coils and lies substantially within a single plane and, hence, forms a path of minimum reluctance. Adjacent laminations, although not lying in parallel planes, still provide a core in which the flux path never has to cross transversely a stack of laminations. Because of this preferred arrangement of the laminations providing a low reluctance flux path there is a minimum amount of eddy current formed in the core. Correspondingly, there is a minimum amount of heat generated which is extremely important in the rotating transformer structure because in the prior art the amount of heat generated in this type of structure was a serious drawback to its commercial adoption.

As might be expected, the assembly of cores made in accordance with this invention is not a simple matter. However, one satisfactory method of assembling these cores is to affix the individual laminations at one end to a flexible member such as a strip of adhesive material and then wrap the strip of material with laminations adhering thereto around a mandrel or the like to form an annular member. The laminations can then be clamped by appropriate means such as ring 35 to hold the laminations in a rigid position and form a substantially solid annular core. This clamping ring can be provided with suitable fan blades to aid in cooling the transformer during operation.

Figure 3:
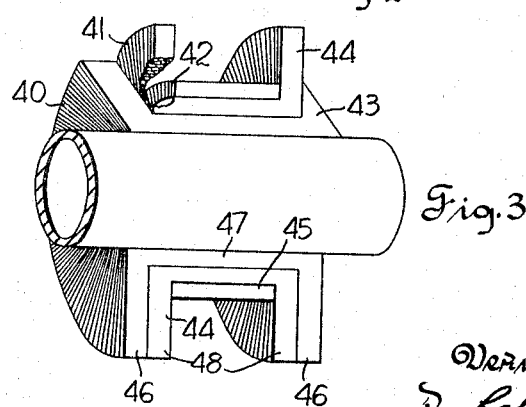
FIG. 3 illustrates an alternate embodiment of a rotating core for a transformer of this invention.

In an alternate embodiment of this invention as illustrated in FIG. 3, a rotating core is made up of three sets of laminations 40, 41 and 42. The laminations 43 of the first set 40 are substantially identical to the U-shaped laminations shown in FIG. 1 except that the connecting or cross member is narrower. The laminations 44 of the second set 41 are also U-shaped members and set within the void formed between the legs 46 and cross member 47 of the laminations 43 of the first set. In the laminations 44 of the second set 41 the legs 48 are shorter so as to terminate at the same radial point as the legs of the first set of laminations. The third set of laminations are merely rectangular members 45 that sit on top of the cross member and between the leg members of the second set of laminations. The laminations of this core are made in three stacks or sets for simplicity in manufacture and to provide a much more solid, compact core. For example, the space between adjacent laminations at the outer periphery of the core is much greater than at the inner periphery thereby reducing the overall potential efficiency of the core. By breaking the laminations down into three or more stacks, a larger number of laminations can be positioned in each of the radially outer stacks. For example, 100 laminations can be positioned on the inner group, 110 may be positioned in the second stack and 130 could be utilized in the outer stack. This provides more overall iron in the rotating core as compared to having the laminations formed individually. As can be seen clearly from FIG. 3, the group of laminations stop short of the radially outer periphery of the end stacks of laminations to provide an area for receiving the coils of the transformer.

Although numerous embodiments of this invention have been illustrated and described, it will be apparent to those skilled in the art that various modifications and changes can be made therein without departing from the spirit of the invention or from the scope of the appended claims.

Having now particularly described and ascertained the nature of my said invention and the manner in which it is to be performed, I declare that what I claim is:

1. An electric transformer comprising: a plurality of iron laminations arranged to define a first annular core member, a second annular core member concentric with said first core member; said second core member having a first set of U-shaped laminations arranged to form an annular member with the leg portions of said laminations extending radially outward, a second set of U-shaped laminations positioned between the legs of said laminations of said first set and being arranged with their legs extending radially outward to define therebetween an annular groove, a third set of laminations having a substantially rectangular shape positioned within said annular groove, said core members combining to define therebetween an annular torus; a first coil positioned within said torus and being connected to a source of current; a second coil positioned in said torus and connected to a load, one of said core members being rotatable relative to the other and each of said laminations of each of said cores lying in a plane that includes the center line of said core.

2. The transformer of claim 1 in which said second set of laminations contains more laminations than said first set and said third set contains more laminations than said second set.

3. A rotatable core for an electric transformer comprising: a first set of U-shaped iron laminations arranged to define an annular member, said laminations having leg portions extending radially outward and being aligned to define therebetween an annular torus; a second set of U-shaped iron laminations arranged to form a second annular member positioned between the legs of said laminations of said first set being arranged with their legs extending radially outward to define therebetween an annular groove; and a set of rectangular iron laminations arranged to form a third annular member positioned between the legs of said laminations of said second set, said rectangular laminations combining with the legs of said second set to define an annular torus for receiving a winding, each of said laminations of each of said members lying in a plane that includes the center line of said core.

4. The core of claim 3 in which said second set contains more laminations than said first set and said set of rectangular laminations contains more laminations than said second set.

References Cited by the Examiner

UNITED STATES PATENTS

| | | | |
|---|---|---|---|
| 432,050 | 7/1890 | Krammeyer | 336—83 |
| 1,394,901 | 10/1921 | Hobart | 336—120 X |
| 2,053,176 | 9/1936 | Bouwers | 336—234 X |
| 2,432,982 | 12/1947 | Braddon et al. | 336—120 X |
| 2,962,679 | 11/1960 | Stratton | 336—234 X |
| 3,118,121 | 1/1964 | Tavis | 336—83 X |
| 3,141,101 | 7/1964 | Ketay | 336—120 X |

FOREIGN PATENTS 909,907   5/1946   France.

LEWIS H. MYERS, *Primary Examiner.*

D. J. BADER, T. J. KOZMA, *Assistant Examiners.*